United States Patent [19]

Kai

[11] Patent Number: 5,444,834
[45] Date of Patent: Aug. 22, 1995

[54] FILLING PATTERN GENERATION APPARATUS AND METHOD INCLUDING CORRECTION FOR PATTERN OVERFLOW

[75] Inventor: Naoyuki Kai, Tokyo, Japan

[73] Assignee: Kabushiki Kaisha Toshiba, Kawasaki, Japan

[21] Appl. No.: 738,555

[22] Filed: Jul. 31, 1991

[30] Foreign Application Priority Data

Jul. 31, 1990 [JP] Japan .................................. 2-201529

[51] Int. Cl.⁶ ............................................. G06T 11/00
[52] U.S. Cl. ..................................... 395/134; 395/133
[58] Field of Search ........ 395/119, 120, 126, 129–132, 395/133, 134, 140–143; 345/136, 201

[56] References Cited

U.S. PATENT DOCUMENTS

| | | | |
|---|---|---|---|
| 5,016,001 | 5/1991 | Minagawa et al. | 395/142 X |
| 5,018,147 | 5/1991 | Kai et al. | 371/49.1 |

OTHER PUBLICATIONS

Principles of Interactive Computer Graphics, Second Edition, William M. Newman and Robert F. Sproull, Published by McGraw-Hill in 1979, pp. 229–243.

Primary Examiner—Almis R. Jankus
Attorney, Agent, or Firm—Banner & Allegretti Ltd.

[57] ABSTRACT

A pattern generation scheme is initiated by abstaining flag information for filling a pattern is obtained from data of an outline quantized on a bit map. The flag information of the outline is written in a work memory for filling, and a filling pattern is obtained in a scanning direction on the bit map. When a drawing point for filling is present outside a work area of the work memory and in scanning start direction on a scan line, a flag for filling is written in a scanning start point in the work area. Even when the outline overflows the work area, a pattern for correctly filling the interior of the outline in the work area can be generated.

17 Claims, 11 Drawing Sheets

A-PLANE MEMORY     B-PLANE MEMORY
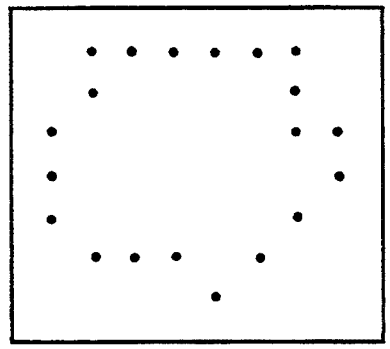 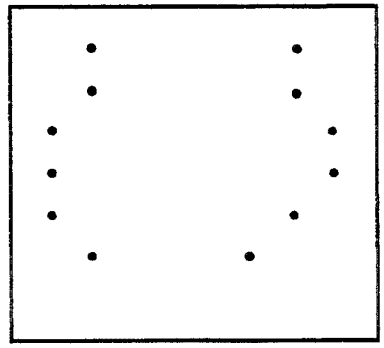
FIG. 3A             FIG. 3B
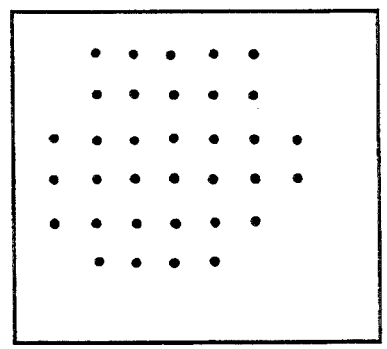
FIG. 3C
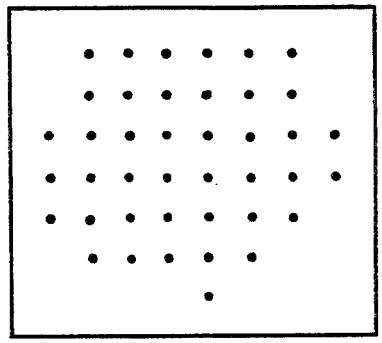
FIG. 3D

  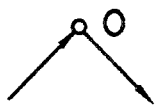 
FIG. 5A   FIG. 5B   FIG. 5H   FIG. 5I
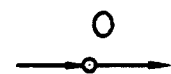 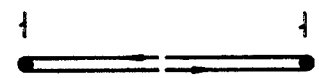
FIG. 5C   FIG. 5J   FIG. 5J*
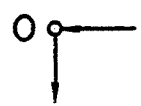 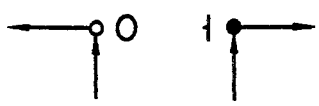 
FIG. 5D   FIG. 5G   FIG. 5K   FIG. 5L
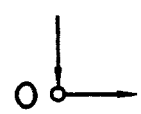  
FIG. 5E   FIG. 5F   FIG. 5N   FIG. 5M
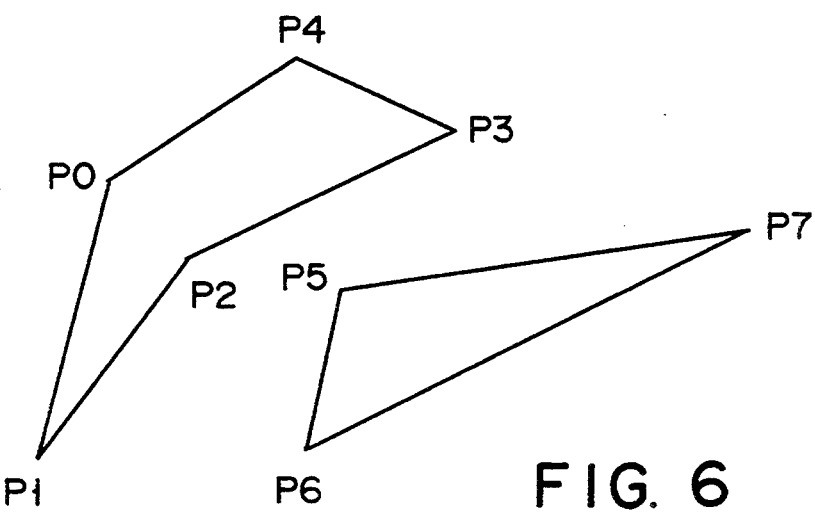
FIG. 6

FILLING PATTERN GENERATION APPARATUS AND METHOD INCLUDING CORRECTION FOR PATTERN OVERFLOW

BACKGROUND OF THE INVENTION

1. Field of the Invention

The present invention relates to a pattern generation scheme of correctly filling the interior of a closed curve defined by an outline with a predetermined pattern, for use in a computer graphics processor or a vector font processor each using bit map display.

2. Description of Related Art

The following method (not prior art) may be possible as a scheme of generating a filling pattern at high speed in accordance with outline information.

Bit map memories having rectangular bit map areas are prepared for two planes A and B.

Outline information of a filling pattern is converted into a raster (converted into a dot pattern) to calculate the differences between bits of an outline (FIG. 2).

On the basis of a series of differences, flags for filling are formed on plane B in accordance with predetermined rules (FIG. 3B).

At the same time, a complete outline is formed on plane A (FIG. 3A).

When formation of the outline is finished, exclusive OR (to be referred to as XOR hereinafter) is sequentially calculated in a scan line direction (FIG. 3C), and a logical operation such as OR with the outline data on plane A is calculated, thereby obtaining a complete filling pattern (FIG. 3D).

The above method has a problem in that if an outline overflows a work area, especially to the left side in the x direction (i.e., a direction toward a scanning start position in the scan line direction), correct filling cannot be performed. For example, an incomplete filling pattern as shown in FIG. 4B is generated with respect to an outline (OL1) as shown in FIG. 4A.

To solve the above problem, there is one possible method (not prior art) in which if an outline overflows to the left of a work area, this outline is divided into several parts and a filling pattern is formed from an overflowed divided portion on the left side.

In this method, in order to perform filling processing for the right-side portion, XOR scanning results on the left side are held in units of scan lines and used as initial values for XOR scanning on the right side, thereby obtaining a correct filling pattern. However, this method also has the following problems.

An extra filling processing memory is required in addition to a main work area.

Since a pattern must be sequentially formed from the divided left side even when only a portion of an outline is to be filled, a time required to generate a filling pattern is prolonged.

SUMMARY OF THE INVENTION

It is an object of the present invention to provide a filling pattern generation scheme capable of generating a correct filling pattern at high speed even when a pattern defined by an outline overflows a work area of a bit map memory.

In order to achieve the above object, the present invention performs two steps of processing, i.e., raster conversion (dot pattern conversion) processing and filling processing for a filling pattern by using a bit map memory.

Assume that two work areas (rectangular work areas having the same shape) A and B are prepared in this bit map memory and called planes A and B. In addition, assume that each work area is a bit map area having a resolution of N*M dots (e.g., 512×128 dots) and data on planes A and B are respectively A (x,y) and B (x,y) (x=0, 1 ..., N-1, y=0, 1, ..., M-1).

In the first processing, raster-converted outline information is given as a series of difference information (dx,dy) between two adjacent points (each of dx and dy takes a value of one of +1, 0, and −1). On the basis of this information, flags ("1" or "0") for filling processing are written on work area plane B in accordance with rules as shown in FIGS. 5A to 5N. At this time, if a drawing point of the outline is present in an area (in a direction along which the x coordinate is decreased) on the left side of the work area, a flag is written in a point having the same y coordinate as that of the drawing point and present at the leftmost position in the work area.

On work area plane A, on the other hand, "1"s are written in points corresponding to the outline on the basis of (dx,dy). If a drawing point overflows the work area on plane A, no drawing is performed.

FIGS. 1A to 1E show a case in which an outline of a filling pattern overflows to the left of a work area. FIG. 1A shows an example of a series of (dx,dy) for defining the outline, FIG. 1B shows data written on plane A in the first step, and FIG. 1C shows data written on plane B in the first step.

Flags of a closed curve (OL2 in FIG. 1A) which is entirely included in an outer area on the left side of the work area are written on plane B. Since the flags are always written an even number of times, they finally disappear upon being written in a B-plane memory by XOR. For example, each of three points F1, F2, and F3 (i.e., flags of OL2) shown in FIG. 1C is finally rendered "0" as the result of XOR because each flag is written twice.

In the second processing, XOR is sequentially calculated in units of scan lines (in this example, in the x direction) as follows.

B (0,y) XOR B (1,y) → B (1,y)

B (1,y) XOR B (2,y) → B (2,y)

B (N-2,y) XOR B (N-1,y) → B (N-1,y)

As a result, a pattern as shown in FIG. 1D is obtained.

Although the contents of the B-plane memory can be directly used as a filling pattern, a more correct filling pattern (FIG. 1E) can be obtained by calculating a logical operation such as OR with the data of the outline separately drawn on plane A. In this manner, even if a pattern outline overflows to the left of a work area, a correct filling pattern can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A to 3D are views for explaining filling performed using two work memories;

FIGS. 5A to 5N are views for explaining an example of filling flag generation rules according to the present invention;

FIG. 6 is a view for explaining an arrangement of an outline of a filling pattern;

DETAILED DESCRIPTION OF THE PREFERRED EMBODIMENT

An embodiment of the present invention will be described below with reference to FIGS. 6 to 13.

This embodiment is an apparatus for generating a pattern for filling the interior of an outline upon receiving outline information of the pattern.

As shown in FIG. 6, an outline of a pattern is defined by a series of line segments. In an example shown in FIG. 6, an outline of a pattern is constituted by two closed loops, the first loop of which is defined by a start point P0 and points P1, P2, P3, and P4, and the second loop of which is defined by a start point P5 and other points P6 and P7. The number of loops in a pattern and the number of points in each loop can be arbitrarily set.

Figure 1A:
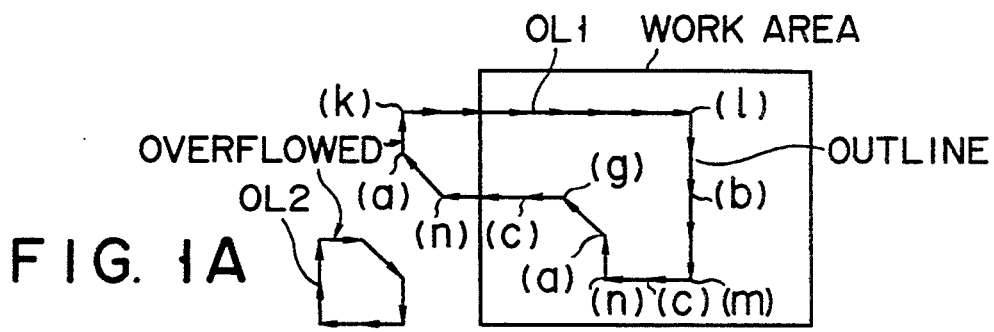
FIGS. 1A to 1E are views for explaining a process of generating a filling pattern according to the present invention.
Figure 1B:
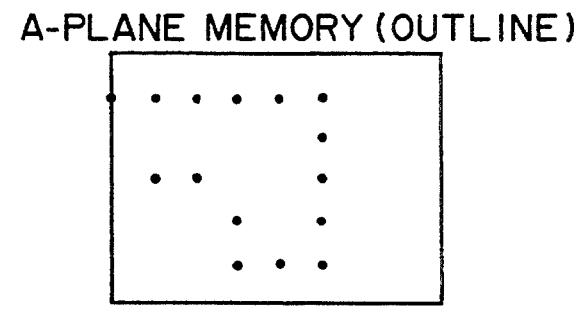
Figure 1C:
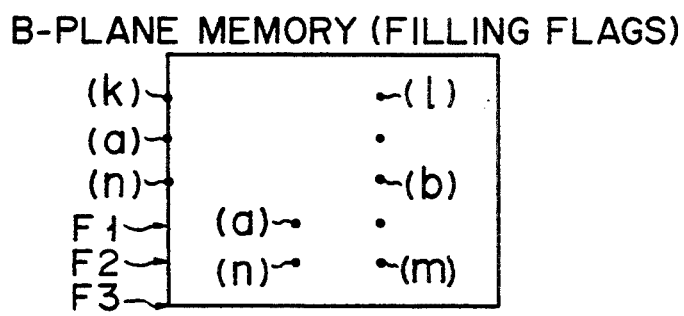
Figure 1D:
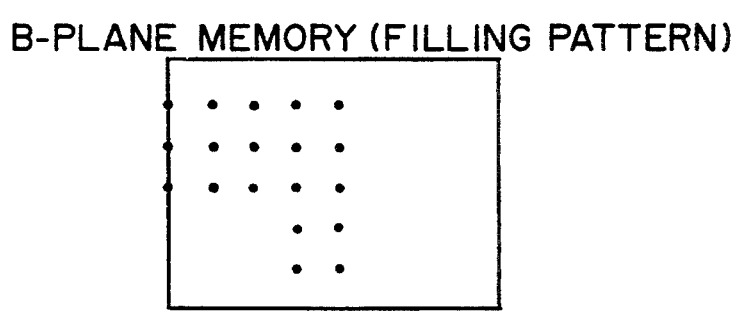
Figure 1E:
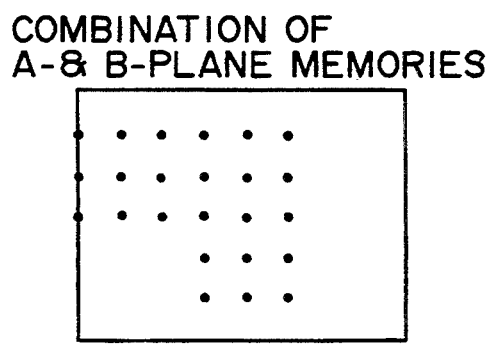
Figure 2:
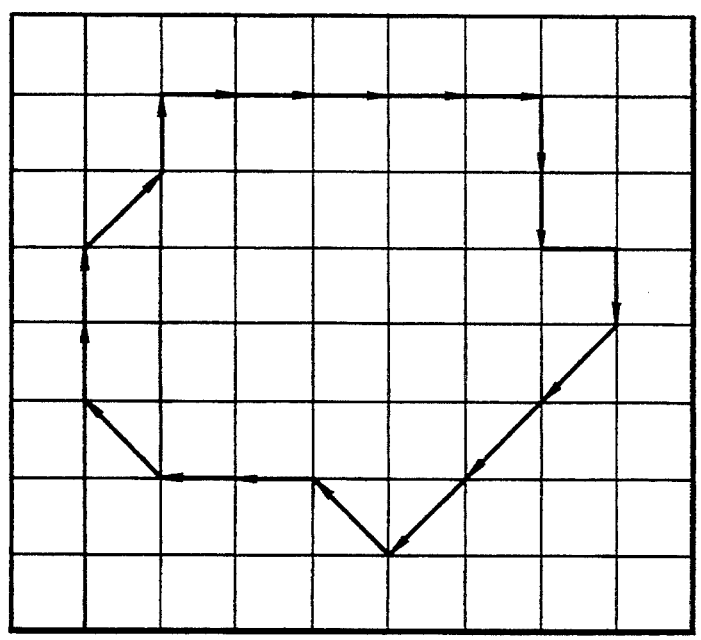
FIG. 2 is a view for explaining differences dx and dy between dots of an outline obtained by converting an outline of a pattern into dots.
Figure 4A:
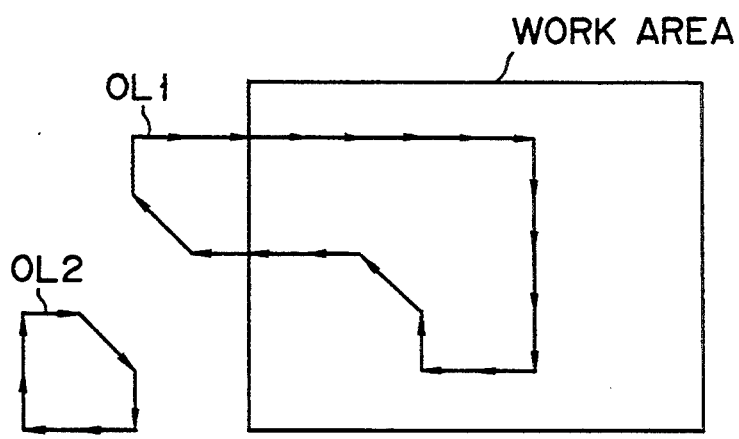
FIGS. 4A and 4B are views for explaining incomplete filling generated when the present invention is not applied.
Figure 4B:
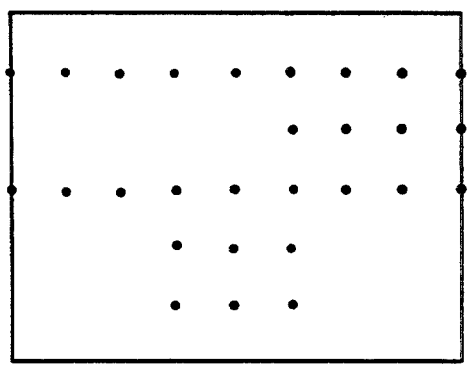
Figure 7:
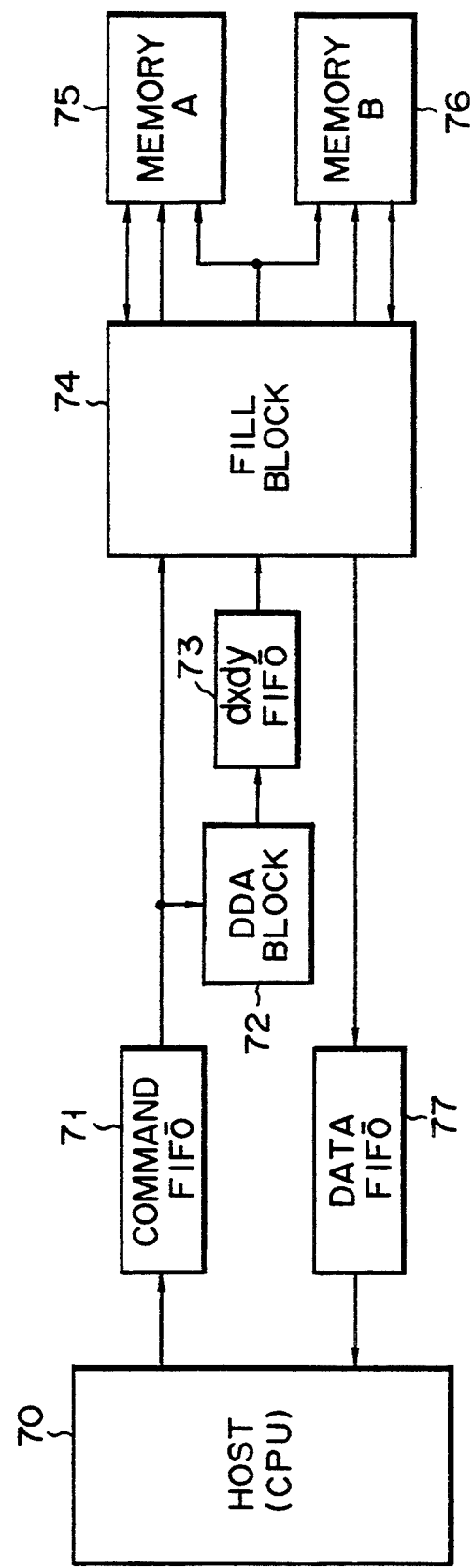
FIG. 7 is a block diagram showing an arrangement of a filling pattern generation apparatus according to one embodiment of the present invention.

FIG. 7 shows an arrangement of hardware according to the embodiment of the present invention. This embodiment comprises memory A (A-plane memory) 75 and memory B (B-plane memory) 76 as work area bit map memories, command FIFO 71, data read FIFO 77, DDA (Digital Differential Analyzer) block 72, dxdy FIFO 73, and FILL (filling) block 74.

Command FIFO 71 is a FIFO (First-In First-Out) buffer memory for storing a command supplied from host system 70 until the command is supplied to the respective internal components of FILL block 74, and the data FIFO is a FIFO buffer memory for temporarily storing a finally generated filling pattern until the pattern is read out to host system 70.

DDA block 72 converts line segments defining an outline of a filling pattern into dot pattern and generates values of dx and dy. This DDA block is described in detail in, e.g., William NEWMAN et. al., "PRINCIPLE OF INTERACTIVE COMPUTER GRAPHICS", 2nd Ed., McGRAW-HILL BOOK COMPANY, 1979, pp. 17–28. In this case, dx and dy represent the differences between the coordinates of adjacent two points obtained when line segments of an outline are raster-converted (i.e., quantized on a bit map). Each of dx and dy takes a value of one of +1, 0, and −1.

The value of dx (dy) is coded as shown in Table 1 below and output from DDA block 72 to dxdy FIFO 73.

TABLE 1

| Value of dx (dy) | Coded value |
| --- | --- |
| −1 | 11 |
| 0 | X0 |
| +1 | 01 |

X means "don't care"

In this case, a dx (dy) output is 4-bit data.

Coding other than the above coding is also possible. For example, combinations of dx and dy may be subjected to 3-bit coding as shown in Table 2 below.

TABLE 2

| dx | dy | Coded value |
| --- | --- | --- |
| +1 | 0 | 000 |
| +1 | +1 | 001 |
| 0 | +1 | 010 |
| −1 | +1 | 011 |
| −1 | 0 | 100 |
| −1 | −1 | 101 |
| 0 | −1 | 110 |
| +1 | −1 | 111 |

FILL block 74 performs filling processing.

Each of memories A and B is a memory which has m-bit addresses and in which one word is constituted by bits. In this case, n is a power of 2, and mainly n=16 in the following description.

Each of memories A 75 and B 76 constitutes a bit map of $2^{lx}*2^{ly}$ (lx+ly=m+4, 4 is log2n). On this bit map, the value ranges of x and y coordinates are as follows:

$$0 \leq x < 2^{lx} \Big\} \quad (1)$$
$$0 \leq y < 2^{ly}$$

Although the same addresses, e.g., 24-bit addresses for lx=12 and ly=12 are supplied to memories A and B, control lines are independently assigned to the two memories. Therefore, read/write can be independently performed for memories A and B.

Figure 13:
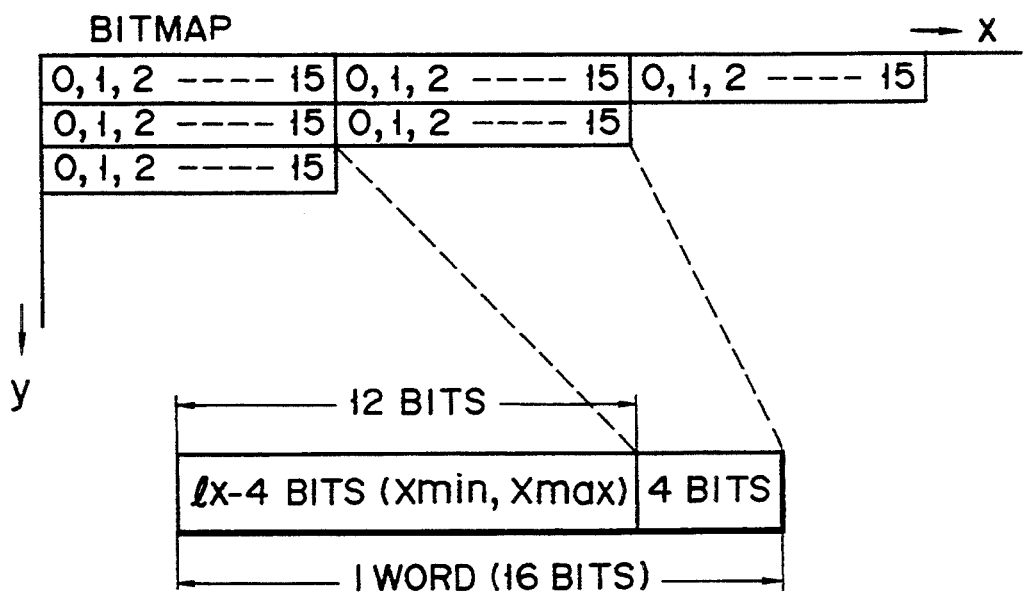
FIG. 13 is a view showing an example of correspondence between a dot array on a bit map and one-word data.

Upper ly (12) bits and lower lx (12) bits of the addresses (24 bits) correspond to the y coordinate and the x coordinate, respectively. In addition, four bits in a word (16 bits) correspond to 16 continuous points in the x direction. For example, points having the same y coordinate and x coordinates from 0 to 15 are stored in the same word (FIG. 13).

FILL block 74 will be described in detail below with reference to FIG. 8.

Figure 8:
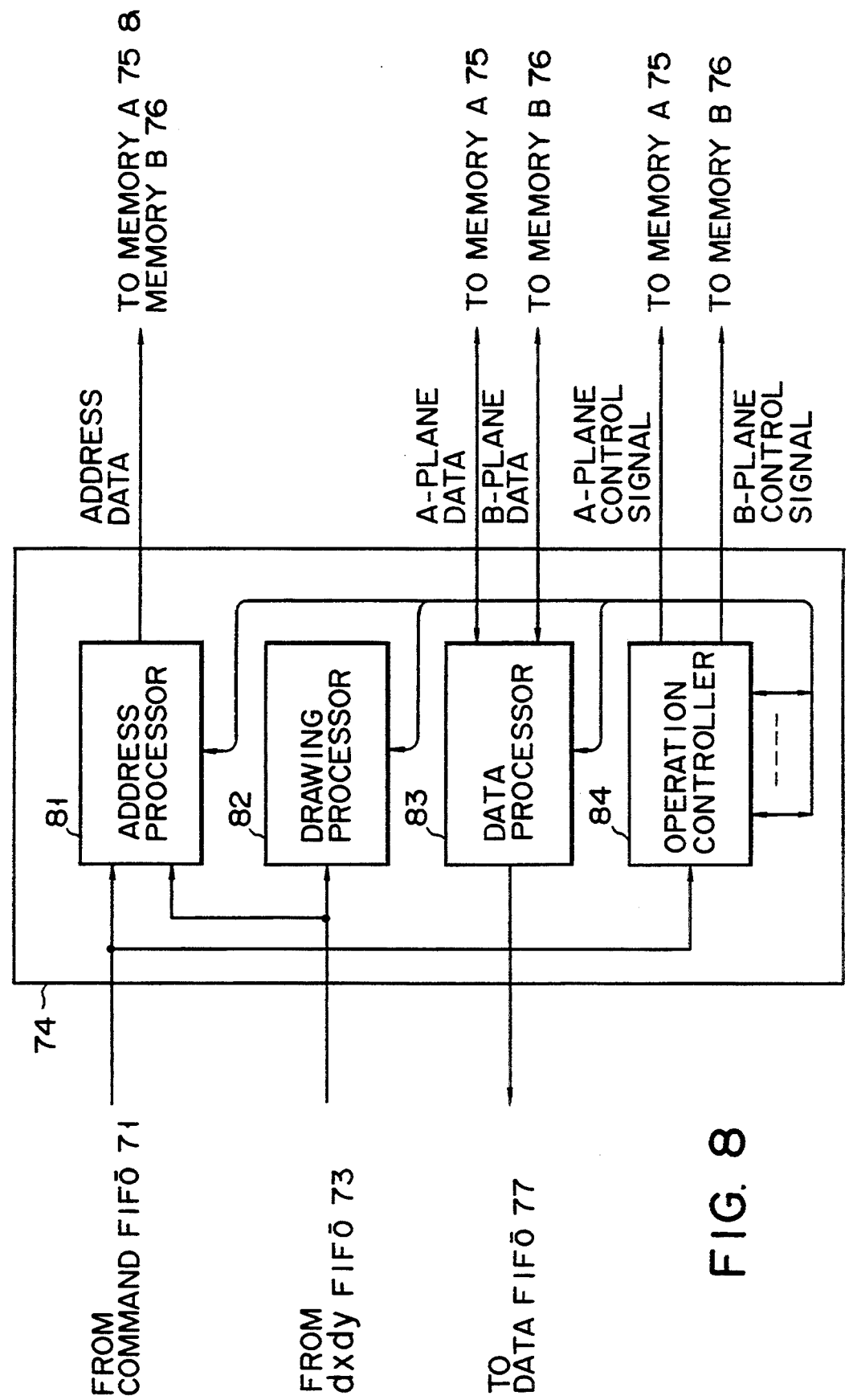
FIG. 8 is a block diagram showing an internal arrangement of an FILL block in the apparatus shown in FIG. 7.

FIG. 8 shows an arrangement of FILL block 74 comprising address processor 81, drawing processor 82, data processor 83, and operation controller 84 for controlling the entire block. "Description of Address Processor 81"

Figure 9:
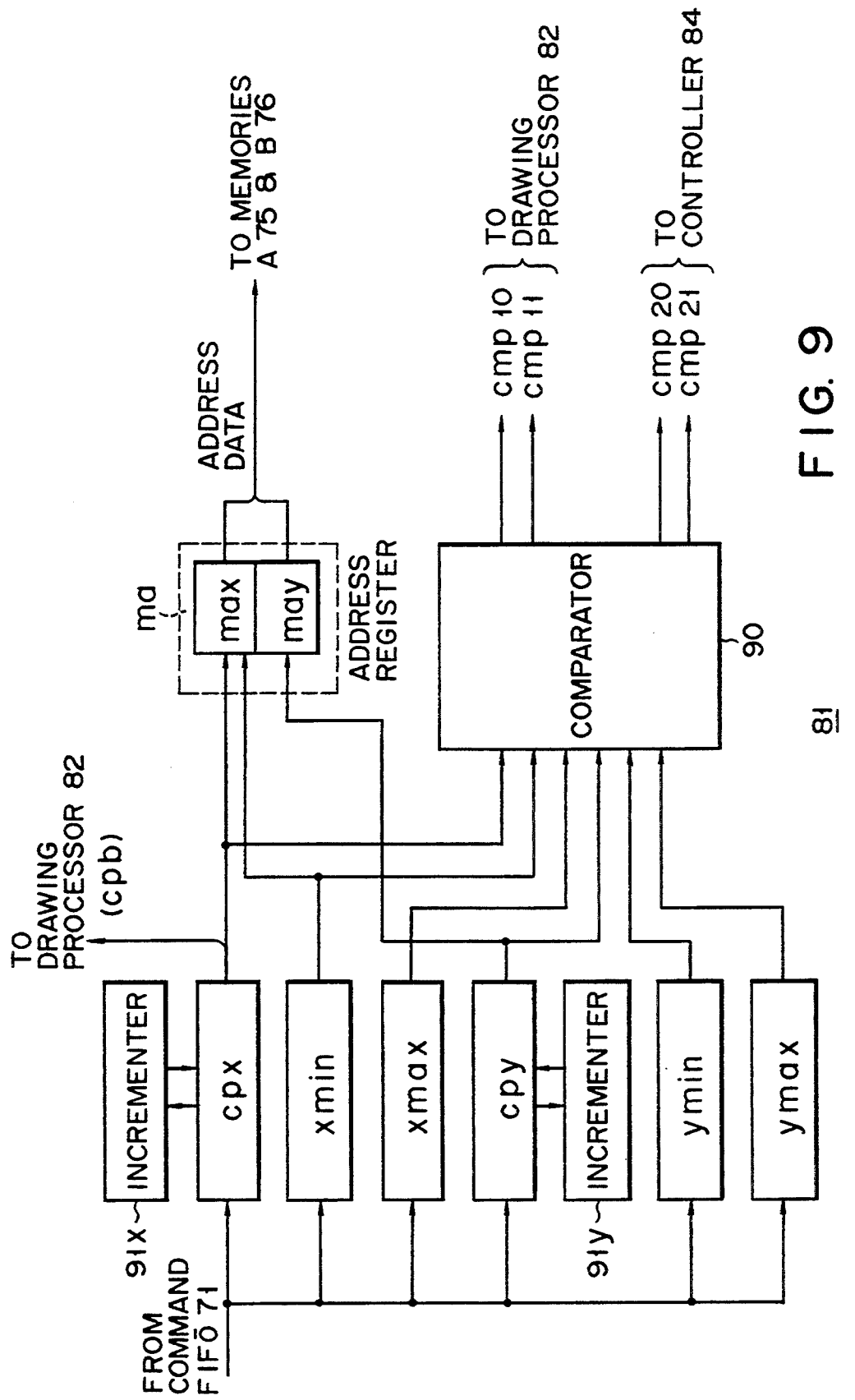
FIG. 9 is a block diagram showing an arrangement of an address processor shown in FIG. 8.

Address processor 81 will be described below with reference to FIG. 9.

Address processor 81 includes current pointers cpx and cpy for indicating x and y coordinates of the current drawing position, incrementers 91x and 91y for updating the contents of pointers cpx and cpy, respectively, registers xmin, xmax, ymin, and ymax for holding the position of a work area, and memory address register ma for holding addresses to be supplied to memories A and B.

In this case, the work area is, e.g., a rectangular area actually used in drawing and filling in a bit map memory.

Each of registers xmin and xmax is constituted by (lx−4) bits (12 bits) (FIG. 13), and each of registers ymin and ymax is constituted by ly bits (16 bits). The content of each register is processed as a number without a sign (i.e., a positive number).

Current pointers cpx and cpy are constituted by (lx+2) bits and (ly+2) bits (i.e., 18 bits each), respectively. The content of each pointer is processed as a number with a sign of a complement of 2. That is, a coordinate value of interest may become a negative number during drawing.

In x portion cpx of the current pointer, four lower bits correspond to bit positions in a word, and a portion except for the four lower bits is defined as cpx'.

Comparator 90 compares cpx' with xmin and xmax, and cpy with ymin and ymax, including signs, and sets "1" in comparison signal cmp 10 if the following condition is satisfied. (In this case, since cpx, and each of xmin and xmax have different bit ranges, "00" is set in two upper bits of each of xmin and xmax before comparison. Similarly, since cpy and each of ymin and ymax have different bit ranges, "00" is set in two upper bits of each of ymin and ymax before comparison.)

$$xmin \leq cpx' \leq xmin \atop ymin \leq cpy \leq ymax \} \quad (2)$$

If the following condition is satisfied, the comparator sets "1" in comparison signal cmp 11.

$$cpx, \leq xmin \atop ymin \leq cpy \leq ymax \} \quad (3)$$

If the following condition is satisfied, comparator 90 sets "1" in comparison signal cmp 20.

$$cpx' = xmax \quad (4)$$

If the following condition is satisfied, comparator 90 sets "1" in comparison signal cmp 21.

$$cpy = ymax \quad (5)$$

During outline drawing, the content of current point cpx is updated by ±1 in accordance with the value of input dx. During execution of filling, xmin is transferred to the portion of cpx', or the content of cpx is updated by +4 (this corresponds to updating of +1 of pointer cpx').

During outline drawing, the content of current pointer cpy is updated by ±1 in accordance with the value of input dy. During execution of filling, ymin is transferred to pointer cpy, or the content of cpy is updated by +1.

Address register ma is constituted by an upper ly bit may and remaining lower portion max. When memory access is performed for drawing, the content of pointer cpy is transferred to may. In a normal operation, the content of cpx' is transferred to max. However, if the drawing point is present in an outer area on the left side of a work area, i.e., if cmp 11 is "1", xmin is transferred instead of cpx' to max.

Address processor 81 transfers the four lower bits of pointer cpx, i.e., a portion indicating bit positions in a word to drawing processor 82. "Description of Drawing Processor 82"

Figure 10:
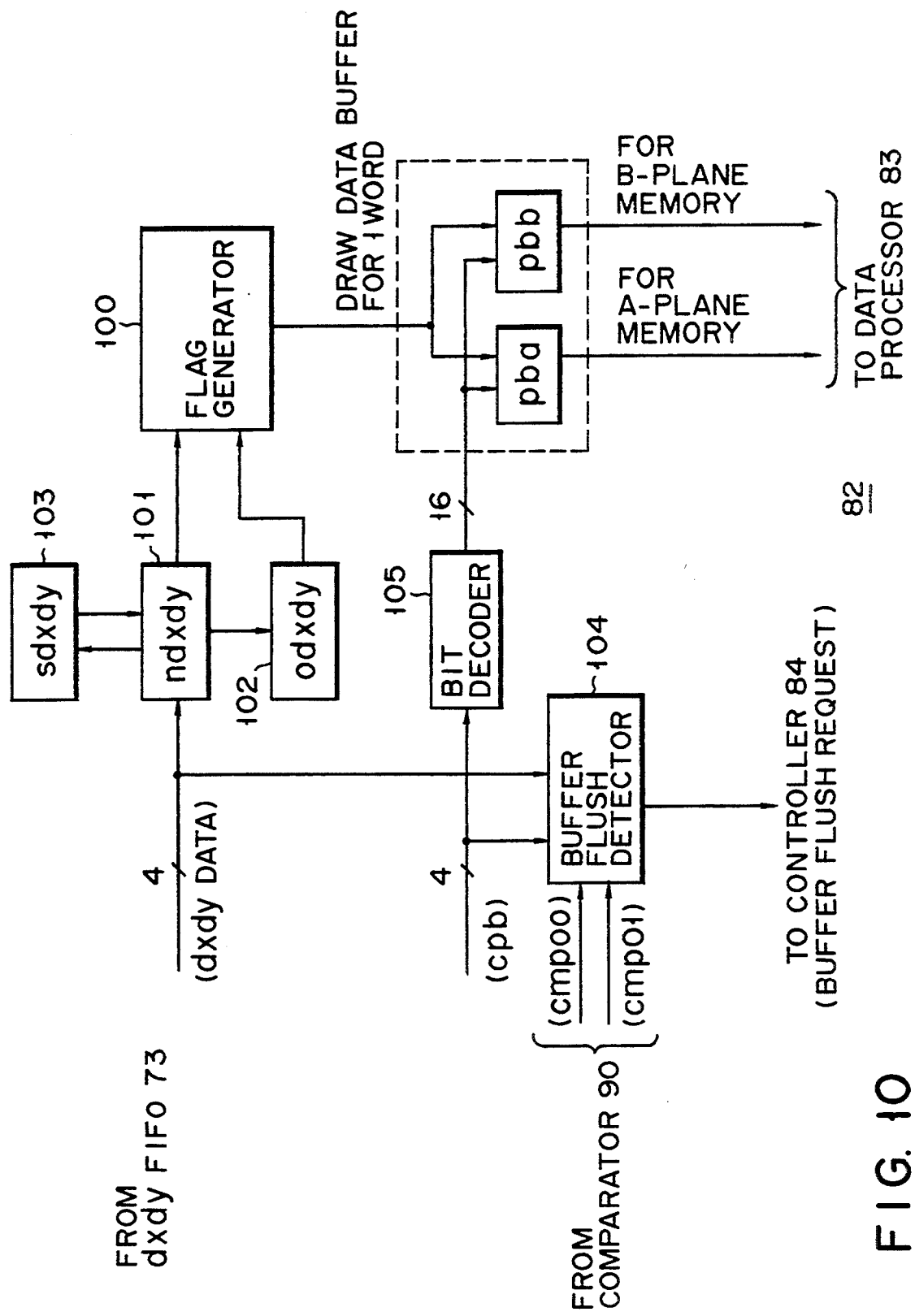
FIG. 10 is a block diagram showing an arrangement of a drawing processor shown in FIG. 8.

Drawing processor 82 will be described below with reference to FIG. 10.

Drawing processor 82 includes ndxdy register 101 for holding a new dxdy value, odxdy register 102 for holding an old dxdy value, and sdxdy register 103 for holding a dxdy value at a start point of a closed loop corresponding to a filling outline.

A dxdy value from dxdy FIFO 73 is supplied to ndxdy register 101 and transferred to odxdy register 102 when the next dxdy value is supplied. The first dxdy value of a loop supplied to ndxdy register 101 is transferred to not only odxdy register 102 but also sdxdy register 103 when the next dxdy value is supplied. In closed loop processing to be described later, the content of ndxdy register 101 is transferred to odxdy register 102, and the content of sdxdy register 103 is transferred to ndxdy register 101.

In this embodiment, when a plurality of drawing points are present in one word, buffering is performed such that drawing is executed not in units of points but for the entire word.

Buffer flush detector 104 detects whether the drawing point exceeds the range of one word in accordance with the value of four lower bits (to be referred to as cpb hereinafter) of pointer cpx from address processor 81 and the value of dxdy from dxdy FIFO 73. More specifically, detector 104 detects that the drawing point exceeds the range of one word if any of the following conditions is satisfied.

$$dy \neq 0 \quad (6)$$

or $$cpb = 7 \text{ and } dx = -1 \quad (7)$$

or $$cpb = 15 \text{ and } dx = +1 \quad (8)$$

If any of the above conditions is satisfied and one of comparison signals cmp 00 and cmp 01 from address processor 81 is "1", buffer flush detector 104 sets a flush request signal line for writing drawing data of one current word in memories A and B at level "1" and sends a buffer flush request to controller 84.

On the basis of the values from ndxdy register 101 and odxdy register 102, flag generator 100 generates flags to be written in accordance with a truth table of Table 3 below.

TABLE 3

| Old dx | Old dy | New dx | New dy | Flag | FIG. 5 |
|--------|--------|--------|--------|------|--------|
| X | +1 | X | +1 | 1 | b |
| X | −1 | X | −1 | 1 | a |
| X | +1 | X | −1 | 0 | i |
| X | −1 | X | +1 | 0 | h |
| X | +1 | +1 | 0 | 0 | e |
| X | +1 | −1 | 0 | 1 | m |
| X | −1 | +1 | 0 | 1 | k |
| X | −1 | −1 | 0 | 0 | g |
| +1 | 0 | X | +1 | 1 | l |
| −1 | 0 | X | +1 | 0 | d |
| +1 | 0 | X | −1 | 0 | f |
| −1 | 0 | X | −1 | 1 | n |
| +1 | 0 | +1 | 0 | 0 | c |
| +1 | 0 | −1 | 0 | 1 | j* |
| −1 | 0 | +1 | 0 | 1 | i |
| −1 | 0 | −1 | 0 | 0 | c |

In Table 3, X means "Don't care", i.e., that any of −1, 0, and +1 is possible. In addition, since dx and dy are not simultaneously "0" (in both "new" and "old"), this combination is omitted from the truth table of Table 3.

In Table 3, the rightmost column indicates a relationship between flag generation rules shown in FIG. 5 and corresponding flags.

Table 4 below may be used as a truth table for determining filling flags.

TABLE 4

| Old dx | Old dy | New dx | New dy | Flag |
|--------|--------|--------|--------|------|
| X | +1 | X | +1 | 1 |
| X | +1 | X | −1 | 0 |
| X | −1 | X | +1 | 0 |
| X | +1 | +1 | 0 | 1 |
| X | +1 | −1 | 0 | 0 |
| X | −1 | +1 | 0 | 0 |
| X | −1 | −1 | 0 | 1 |
| +1 | 0 | X | +1 | 0 |
| −1 | 0 | X | +1 | 1 |
| +1 | 0 | X | −1 | 1 |
| −1 | 0 | X | −1 | 0 |
| +1 | 0 | +1 | 0 | 0 |
| +1 | 0 | −1 | 0 | 1 |
| −1 | 0 | +1 | 0 | 1 |
| −1 | 0 | −1 | 0 | 0 |

Bit decoder 105 decodes 4-bit cpb to generate a 16-bit signal in which only one bit is "1". As shown in the truth table of Table 5 below, when comparison signal cmp 11 is "1", i.e., when the drawing point is present in an outer area on the left side of a work area, bit 0 of an output from bit decoder 105 is constantly "1".

TABLE 5

| cmp 11 | cpb | Decoder output |
|--------|-----|----------------|
| 0 | 0000 | 1000000000000000 |
|   | 0001 | 0100000000000000 |
|   | .... |  |
|   | 1111 | 0000000000000001 |
| 1 | X | 1000000000000000 |

As described above, when cmp 11 is "1", the value of xmin at the left end of a work area is written in x portion max of the address register, and the drawing point in one word is present at the leftmost side of the word. Therefore, drawing is performed for a point at the left end of the work area.

Each of drawing buffers pba and pbb is a 16-bit register for holding drawing data of one word.

When one dxdy data is supplied, bit position data in buffers pba and pbb designated by an output from bit decoder 105 are changed. As a result, A-plane buffer pba sets "1" in a corresponding bit, and B-plane buffer pbb XOR-writes the flag value of an output from flag generator 100 in a corresponding bit. That is, buffer pbb inverts the corresponding bit if the flag value is "1" and does not change it if the flag value is "0".

When the contents of drawing buffers pba and pbb are transferred to data processor 83 at an output timing of a buffer flush request, an arithmetic operation (to be described later) is performed between the transferred contents and read data from memory B, and the arithmetic operation results are written in memories A and B.

After the contents of drawing buffers pba and pbb are transferred to data processor 83, all bits of the contents are cleared to be "0". "Description of Data Processor 83"

Figure 11:
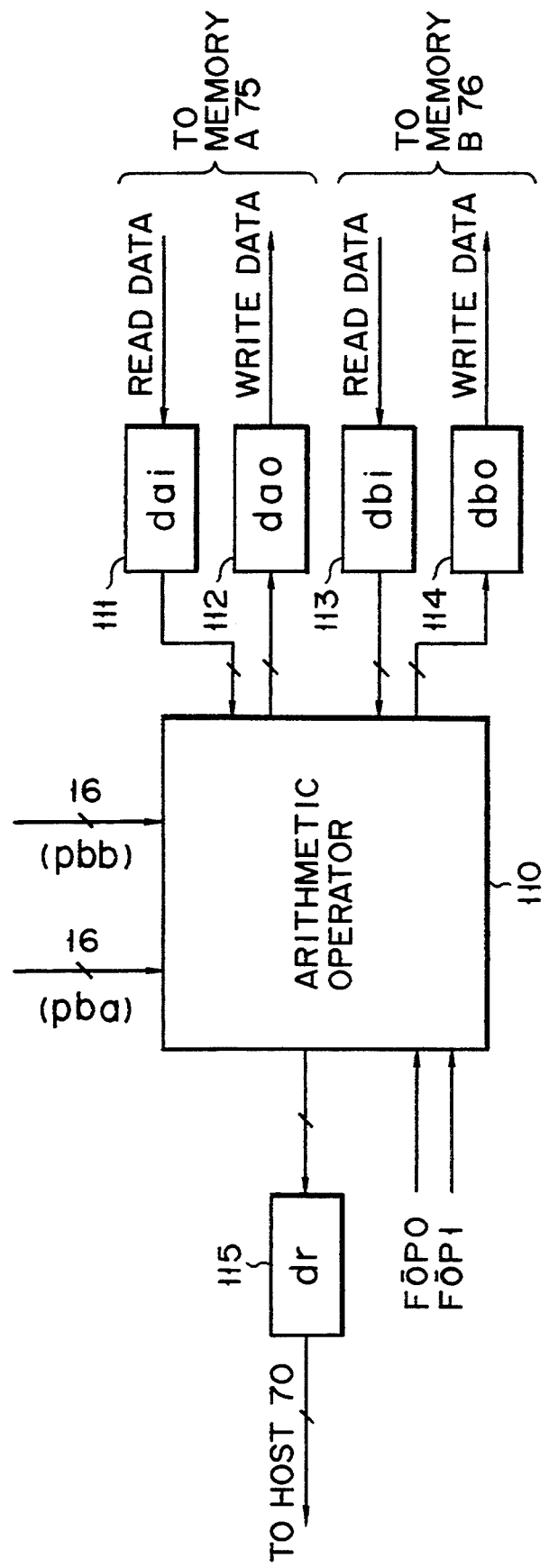
FIG. 11 is a block diagram showing an arrangement of a data processor shown in FIG. 8.

As shown in FIG. 11, data processor 83 comprises input register dai 111 and output register dao 112 with respect to memory A 75, input register dbi 113 and output register dbo 114 with respect to memory B 76, data register dr 115 for data transfer to host system 70, and arithmetic operator 110.

Arithmetic operator 110 functions as follows in accordance with the contents of two control signals FOP0 and FOP1 from controller 84 and an operation of drawing processor 82. * Drawing (FOP0="0")

As will be described below, for plane A, OR of the contents of buffer pba and read data from memory A is calculated and written in dao 112. For plane B, XOR of the contents of buffer pbb and read data from memory B is calculated and written in dbo 114.

| dai | (0) | OR cpa | (0) | → | dao | (0) |
| dai | (1) | OR cpa | (1) | → | dao | (1) |
| ... | ... |  |  |  |  |  |
| dai | (15) | OR cpa | (15) | → | dao | (15) |
| dbi | (0) | XOR cpb | (0) | → | dbo | (0) |
| dbi | (1) | XOR cpb | (1) | → | dbo | (1) |
| ... | ... |  |  |  |  |  |
| dbi | (15) | XOR cpb | (15) | → | dbo | (15) |

*Filling arithmetic operation (FOP0 = "1")

Filling pattern data of one word is generated from the read data from memories A and B and FDATA as an output from a one-bit FF (flip-flop) in arithmetic operator 110 and is written in register dr 115, and FDATA is updated. In addition, to clear memories A and B, "0"s are written in all bits of dao 112 and dbo 114.

| (FDATA AND FOP1) XOR dbi (0) | → | tmp (0) |
| tmp (0) XOR dbi (1) | → | tmp (1) |
| tmp (1) XOR dbi (2) | → | tmp (2) |
| ... ... |  |  |
| tmp (14) XOR dbi (15) | → | tmp (15) |
| tmp (0) OR dai (0) | → | dr (0) |
| tmp (1) OR dai (1) | → | dr (1) |
| tmp (15) OR dai (15) | → | dr (15) |
| tmp (15) | → | FDATA |

In the above description, "tmp" means an intermediate signal line.

Control line FOP1 is set at "0" when a word at the left end of a work area is to be processed and "1" in other cases.

By the last-half arithmetic operation described above, all points on an outline are included in a filling pattern.

On the other hand, the above arithmetic operation may be modified as follows so that no points on an outline are included in a filling pattern. (In this case, "-" means logical NOT.)

| | |
|---|---|
| tmp (0) AND -dai (0) | → dr (0) |
| tmp (1) AND -dai (1) | → dr (1) |
| ... ... | |
| tmp (15) AND -dai (15) | → dr (15) |

"Overall Control"

With the above arrangement, the overall apparatus shown in FIG. 7 operates as follows.

External equipment controls the apparatus by sequentially supplying a command/parameter pair having the following format to the apparatus.

| Command | Parameter |
|---|---|

For example, a command is defined as described in Table 6 below.

TABLE 6

| Command | Meaning of command | Meaning of parameter |
|---|---|---|
| 000 | Straight line drawing | x or y coordinate of end point of straight line |
| 001 | Move | x or y coordinate of destination of move |
| 010 | Filling | Meaningless |
| 011 | Clear | Meaningless |
| 100 | Work area set 1 | xmin of work area |
| 101 | Work area set 2 | ymin of work area |
| 110 | Work area set 3 | xmax of work area |
| 111 | Work area set 4 | ymax of work area |

These externally written commands are supplied to command FIFO 71 and transferred to the respective blocks in accordance with progress of internal processing.

Procedures for generating a filling pattern such as a character (vector font) by using the apparatus shown in FIG. 7 will be described below.

(1) First, a work area is set by the commands of work area set 1 to 4 described in Table 6. As a result, values are set in registers xmin, xmax, ymin, and ymax of filling block address processor 81.

(2) Subsequently, "0"s are written in work areas of memories A and B by the clear command. When the clear command is started, the values of xmin and ymin are transferred to current pointers cpx, and cpy, respectively, and "0"s are written in the memories while cpx' is sequentially incremented by "1". When clear for one line is finished, comparison signal cmp 20 becomes "1".

Controller 84 determines the end of operation of one line in accordance with signal cmp 20 and transfers xmin again to cpx' to increment the value of cpy by "1". when clear for the entire work area is finished, both of comparison signals cmp 20 and cmp 21 become "1", and controller 84 terminates processing of the command in accordance with the signals.

(3) Subsequently, the move command is supplied twice to set x and y coordinates of a parameter in pointers cpx and xpy of address processor 81.

(4) The straight line command is supplied. In accordance with this command, DDA block 72 sequentially generates the value of dxdy obtained by quantizing a straight line and writes the values in dxdy FIFO 73.

(5) If values are present in dxdy FIFO 73, FILL block 74 sequentially fetches the values. Drawing processor 82 in FILL block 74 supplies the fetched dx and dy values in ndxdy register 101. When the second dxdy is fetched, the content of ndxdy register 101 is transferred to sdxdy register 103 and odxdy register 102.

Subsequently, on the basis of the contents of ndxdy register 101 and odxdy register 102, the contents of drawing buffers pba and pbb are updated by using the value of a filling flag generated by flag generator 100.

When the third and subsequent dxdy are fetched, the content of ndxdy register 101 is transferred to only odxdy register 102. Updating of the contents of drawing buffers pba and pbb is performed as is the case with the second dxdy.

If the drawing point exceeds the range of one word of drawing buffers pba and pbb by a series of dxdy values and one of comparison signal cmp 00 and cmp 01 is "1" (i.e., the drawing point is present in a work area or in an outer area on the left side of the work area), the contents of drawing buffers pba and pbb are arithmetically operated between data on planes A and B of memories, and the arithmetic operation result is written in memory B, as described above.

Steps of items (4) and (5) above are repeated the number of times corresponding to the number of straight lines constituting one closed curve.

(6) To prepare for drawing of the next closed curve, drawing of a start point of the immediately preceding closed line, which is not drawn when the move command is generated, is performed. At this time, the content of ndxdy register 101 is transferred to odxdy register 102, and the content of sdxdy register 103 is transferred to ndxdy register 101.

Drawing flags are obtained using the new contents of ndxdy register 101 and odxdy register 102. As a result, drawing buffers pba and pbb are updated, and the obtained flags are written in work memory B.

(7) When drawing of all closed curves is finished, the filling command is supplied, and controller 84 activates a filling operation in accordance with the command. When the filling command is started, the values of xmin and ymin are transferred to current pointers cpx' and cpy, as is the case with the clear command. The filling operation is performed in units of words while pointer cpx' is sequentially incremented by "1".

As a result, a filling pattern of one word is obtained as described above in the description of data processor 83 of FILL block 74 and is supplied to data FIFO 77.

When comparison signal cmp 20 becomes "1", filling processing of one line is finished. Therefore, mxin is transferred again to pointer cpx,, and the value of pointer cpy is incremented by "1" thereby starting the processing for the next line.

When both of comparison signals cmp 20 and cmp 21 become "1", processing of the entire work area is finished to terminate the filling command processing.

(8) The filling data written in data FIFO 77 by the filling command are sequentially read out to supply give a filling pattern to external host system 70.

In this embodiment, each of memories A and B adopts a memory arrangement in which one word is constituted by 16 bits. However, the memory may adopt another arrangement.

In addition, although A- and B-plane work memories are described as separate memories, they may be physically the same memory. In this case, discrimination between planes A and B may be performed by a part (e.g., the most significant bit) of an address to sequentially access planes A and B.

Furthermore, only plane B may be used to omit a logical operation (such as OR) with plane A during filling, thereby decreasing a necessary capacity of the memory.

Moreover, in place of performing an OR operation (A+B) of A and B planes, an AND operation ($\overline{A}*B$) of the inverted contents of A plane and the scanned contents of B plane may be performed.

Figure 12:
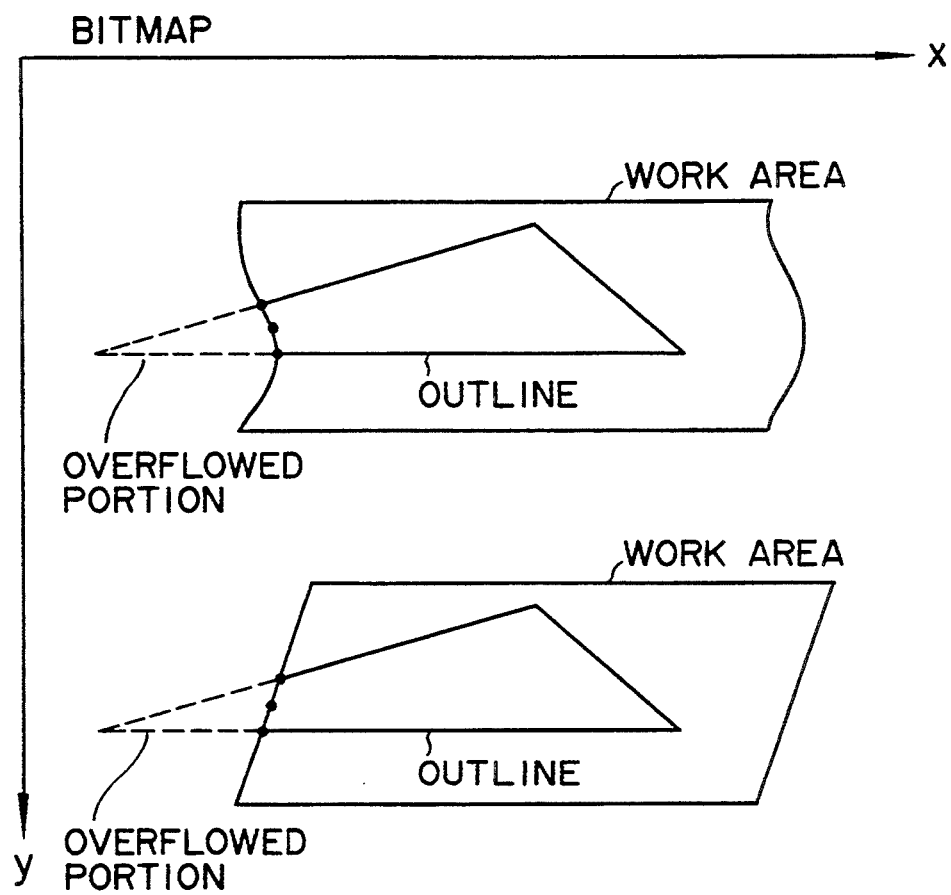
FIG. 12 is a view showing examples of the shape of a work area except for a rectangle.

Note that the shape of a work are is not limited to a rectangle but may be shapes as those of work areas (1) and (2) shown in FIG. 12 (i.e., shapes of the right and left sides can be arbitrarily set provided that the upper and lower sides extending along the scanning direction are parallel to each other).

Drawing processor 82 and (or) data processor 83 shown in FIG. 8 can be realized by software using a high-speed CPU. Although software processing is more disadvantageous in processing speed than filling (XOR processing) performed by hardware, a filling pattern can be freely determined (changed) by software.

Regardless of whether the filling processing is performed by software or hardware, if a filling outline overflows a work area in a scanning start direction, a complete filling pattern can be obtained by the present invention without using any extra memory exceeding a work area.

According to the present invention, in generation of a filling pattern from outline information, if a pattern outline overflows a memory area used as a work area, a correct filling pattern can be obtained at high speed without using any extra memory area exceeding the work area.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A filling pattern generation apparatus comprising:
   means for supplying data having a predetermined pattern on a bit map;
   means for detecting outline information corresponding to an outline of said predetermined pattern;
   means for detecting flag information for filling an interior space defined by the outline of the predetermined pattern from the outline information;
   means for generating data for filling the interior space defined by said outline based on the flag information while scanning predetermined scan lines from scanning start points on a scanning start side to scanning end points on a scanning end side in a work area defined on said bit map; and
   means for converting a filling start point on one of said predetermined scan lines present outside said work area to a corrected filling start point inside said work area when said outline overflows said work area on a start side of scanning.

2. An apparatus according to claim 1, wherein said detecting means includes means for converting a line of the outline into a dot pattern, and generating the outline information in accordance with a difference between two adjacent coordinates of the bit map obtained at the dot pattern converting.

3. An apparatus according to claim 1, further comprising:
   first storage means for storing the outline; and
   second storage means for storing the filling data.

4. An apparatus according to claim 3, wherein said second storage means includes means for sequentially and logically operating exclusive OR of the flag information and data aligned in a direction of the scanning so as to provide the filling data.

5. An apparatus according to claim 4, further comprising:
   means for logically operating the contents of said first and second storage means.

6. A filling pattern generation apparatus comprising:
   means for obtaining flag information for filling an interior space of an outline quantized on a bit map from data defining the outline;
   a work memory having a work area;
   means for obtaining a filling pattern from said flag information in a given scanning direction on the bit map, wherein said filling pattern comprises filling start points and filling end points along predetermined scan lines within said work area; and
   means for converting a filling start point of said filling pattern present outside said work area to a corrected filling start point inside the work area.

7. An apparatus according to claim 6, further comprising:
   memory area A in which the outline constituted on the basis of the quantized outline data is written;
   memory area B in which data obtained by sequentially calculating exclusive OR of the filling flag information in the scanning direction is written; and
   means for performing a predetermined logical operation between data at corresponding positions of said memory areas A and B so that a result of the logical operation serves as the filling pattern.

8. An apparatus according to claim 7, wherein the predetermined logical operation performed between said memory areas A and B includes an OR operation.

9. A pattern generation apparatus in which flag information for filling an outline quantized on a bit map is obtained from data defining the outline, the flag information of the outline is written in a work memory having a work area provided for filling, and a filling pattern is generated in a scanning direction on said bit map, the pattern generation apparatus comprising:
   means for generating a pattern for filling an interior of said outline written in said work area, wherein said filling pattern includes filling start points and filling end points on predetermined scan lines of said work area; and
   means for convening a filling start point present outside said work area in a scanning start direction to a corrected filling start point inside the work area.

10. An apparatus according to claim 9, wherein said work memory includes two memory areas A and B, further comprising:
    means for constituting the outline on the basis of the quantized outline data, and writing the constituted outline in said memory area A;

means for sequentially calculating exclusive OR of the flag information in the scanning direction, and writing data obtained by the sequential calculation in said memory area B; and means for performing a predetermined logical operation between data at corresponding positions of said memory areas A and B so that a result of the logical operation serves as the filling pattern.

11. An apparatus according to claim 10, wherein the predetermined logical operation performed between said memory areas A and B includes an OR operation.

12. A filling pattern generation method using a bit map memory having a predetermined work area, an address processor, a drawing processor, and a data processor, comprising the steps of:

calculating a difference of coordinates between a series of adjacent points obtained by quantizing outline data of a filling pattern on a bit map, generating a drawing address with said address processor according to data of the calculated difference, when the drawing address indicates that a drawing point for filling is present on a scan line outside said work area in a scan line start direction, changing the drawing point to a filling start point inside said work area on said scan line, generating a filling flag with said drawing processor based on the calculated difference data, and writing, with said data processor, a result of exclusive OR operation between data of a memory address designated by the drawing address and the filling flag in the memory address.

13. A method according to claim 12, further comprising a step of:

sequentially calculating, in said work area, exclusive OR of data on scan lines in a scanning direction of said bit map memory to generate the filling pattern.

14. A filling pattern generation apparatus for filling an interior space of a closed curve defined by an outline, comprising:

means for generating outline data based on differences between the coordinates of adjacent points when said outline is quantized on a bit map;

means for generating filling flag data including set and unset flags on a work area based on said outline data and filling flag generation rules, said work area defined by maximum and minimum points along a first coordinate axis and maximum and minimum points along a second coordinate axis;

means for determining if a point of said outline defined by a first coordinate relative to said first axis and a second coordinate relative to said second coordinate axis is outside said work area; and means for setting a filling flag at a point defined by said second coordinate and one of said maximum and minimum points along said first coordinate axis if said determining means determines that the point defined by said first and second coordinates is outside said work area.

15. A filling pattern generation apparatus for filling an interior space of a closed curve defined by an outline, comprising:

means for generating outline data based on differences between the coordinates of adjacent points when said outline is quantized on a bit map, said bit map having a first and second work area;

means for generating filling flag data including set and unset flags on said first work area based on said outline data and filling flag generation rules, said first work area defined by maximum and minimum points along a first coordinate axis and maximum and minimum points along a second coordinate axis;

means for determining if a point of said outline defined by a first coordinate relative to said first axis and a second coordinate relative to said second coordinate axis is outside said first work area in a predetermined direction along said first coordinate axis by comparing a first coordinate of said point with a first coordinate of said maximum point along said first coordinate axis; and means for setting a filling flag at a point defined by said second coordinate of said point and said first coordinate of said maximum point along said first coordinate axis if said determining means determines that the point defined by said first and second coordinates is outside of said work area in said predetermined direction.

16. A pattern generation filling apparatus according to claim 15, further comprising:

means for writing drawing point data corresponding to said outline onto said second work area of said bit map, wherein no drawing point data is written for portions of said outline outside of said second work area; and scanning means for scanning said first and second work areas in an opposite direction to said predetermined direction along said first coordinate axis using a logic operation, wherein said filling flag data on said first work area and said drawing point data on said second work area are logically combined into a single set of data point representing a final filling pattern.

17. A pattern filling generation apparatus according to claim 16, wherein said logic operation is an XOR operation.

* * * * *